US011119902B2

(12) United States Patent
Lees et al.

(10) Patent No.: US 11,119,902 B2
(45) Date of Patent: Sep. 14, 2021

(54) CREATING A HIGHER ORDER MUTANT FOR MUTATION TESTING SOFTWARE

(71) Applicant: International Business Machines Corporation, Armonk, NY (US)

(72) Inventors: Andrew Michael Lees, Ferndown (GB); Grace Jansen, Southampton (GB); Bhavnit Patel, Luton (GB); Alexander John Naylor-Teece, Newbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/679,438

(22) Filed: Nov. 11, 2019

(65) Prior Publication Data

US 2021/0141714 A1    May 13, 2021

(51) Int. Cl.
*G06F 11/36* (2006.01)
*G06F 11/30* (2006.01)
*G06F 11/34* (2006.01)

(52) U.S. Cl.
CPC ........ *G06F 11/3684* (2013.01); *G06F 11/302* (2013.01); *G06F 11/3409* (2013.01); *G06F 11/3688* (2013.01)

(58) Field of Classification Search
CPC .............. G06F 11/302; G06F 11/3409; G06F 11/3664–3696
See application file for complete search history.

(56) References Cited

U.S. PATENT DOCUMENTS

| 7,757,222 | B2 | 7/2010 | Liao et al. |
| 9,772,927 | B2* | 9/2017 | Gounares .............. G06F 11/079 |
| 2016/0283345 | A1* | 9/2016 | Gounares ................ G06F 17/00 |

FOREIGN PATENT DOCUMENTS

CN        105808426 A     7/2016

OTHER PUBLICATIONS

Offutt, A., "Investigations of the Software Testing Coupling Effect", ACM Transactions on Software Engineering and Methodology, vol. 1, No. 1 [online], 1992 [retrieved Nov. 21, 2020], Retrived from Internet: <URL: https://dl.acm.org/doi/abs/10.1145/125489.125473>, pp. 5-20.*

Gligoric, M., et al., "MuTMuT: Efficient Exploration for Mutation Testing of Multithreaded Code", 2010 Third International Conference on Software Testing, Verification and Validation [online], 2010 [retrieved Nov. 21, 2020], Retreived from Internet: <URL: https://ieeexplore.ieee.org/abstract/document/54771, pp. 55-64.*

(Continued)

*Primary Examiner* — Todd Aguilera
(74) *Attorney, Agent, or Firm* — Kelli D. Morin

(57) ABSTRACT

A computer-implemented method for creating a higher order mutant for mutation testing software is disclosed. The method includes, for each software test of a set of software tests, identifying a respective code path. The method further includes, for each first order mutant of a plurality of first order mutants, associating the first order mutant with the one or more identified code paths it interacts with. The method further includes creating a higher order mutant by combining two or more first order mutants based on the one or more associated code paths.

20 Claims, 8 Drawing Sheets

(56) References Cited

OTHER PUBLICATIONS

Clifton, M. "Simple Code Path Testing," https://www.codeproject.com/Articles/9793/Simple-Code-Path-Testing, printed Oct. 17, 2019, 2 pgs.
Frankel, N., "Faster Mutation Testing," https://blog.frankel.ch/faster-mutation-testing/, printed Oct. 17, 2019, 3 pgs.
Harman et al., "A Manifesto for Higher Order Mutation Testing," http://citeseerx.ist.psu.edu/viewdoc/download?doi=10.1.1.211.9504&rep=rep1&type=pdf, King's College London, 2010 Mutation keynote given by Mark Harman and based on the work of all three authors on Higher Order Mutation Testing, pp. 1-10.
Kintis et al., "Isolating First Order Equivalent Mutants via Second Order Mutation," 2012 IEEE Fifth International Conference on Software Testing, Verification and Validation, pp. 701-710, © 2012 IEEE.
Nguyen et al., "Problems of Mutation Testing and Higher Order Mutation Testing," http://madeyski.e-informatyka.pl/download/NguyenMadeyski14.pdf, accessed Oct. 17, 2019, 15 pgs.
Nichols et al., "Faster Fuzzing: Reinitialization with Deep Neural Models," arXiv:1711.02807v1 [cs.AI] Nov. 8, 2017, 7 pgs.
Parsai et al., "A Model to Estimate First-Order Mutation Coverage from Higher-Order Mutation Coverage," arXiv:1610.01245v1 [cs.SE] Oct. 5, 2016, 9 pgs.
Unknown, "FAQ," http://pitest.org/faq/, printed Oct. 17, 2019, 4 pgs.
Unknown, "How fast (or slow) mutation testing really is?", https://solidsoft.wordpress.com/2017/09/19/how-fast-or-slow-mutation-testing-really-is/, printed Oct. 22, 2019, 4 pgs.
Unknown, "Real world mutation testing," http://pitest.org/, printed Oct. 17, 2019, 4 pgs.

\* cited by examiner

CREATING A HIGHER ORDER MUTANT FOR MUTATION TESTING SOFTWARE

BACKGROUND

The present disclosure relates generally to mutation testing software, and more particularly to creating a higher order mutant for mutation testing software.

Traditional mutation testing is typically used to evaluate the quality of existing tests in software. The process involves modifying a program in small ways to create "mutants" of the original code. A mutant comprises one or more mutations which are often based on well-defined mutation operators that either mimic typical programming errors (such as using the wrong operator or variable name) or force the creation of valuable tests by causing the behaviour of the original version to differ from that of the mutant. Such tests may be user-defined and may include unit tests (i.e., individual predefined sub-tests). The purpose of mutation testing is to help software engineers locate weaknesses in their tests and to fix these weaknesses to create more effective tests.

SUMMARY

Embodiments of the present disclosure include a method, computer program product, and system for creating a higher order mutant for mutation testing software. The method comprises, for each software test of a set of software tests, identifying a respective code path. The method further comprises, for each first order mutant of a plurality of first order mutants, associating the first order mutant with the one or more identified code paths it interacts with. The method further comprises creating a higher order mutant by combining two or more first order mutants based on the one or more associated code paths.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
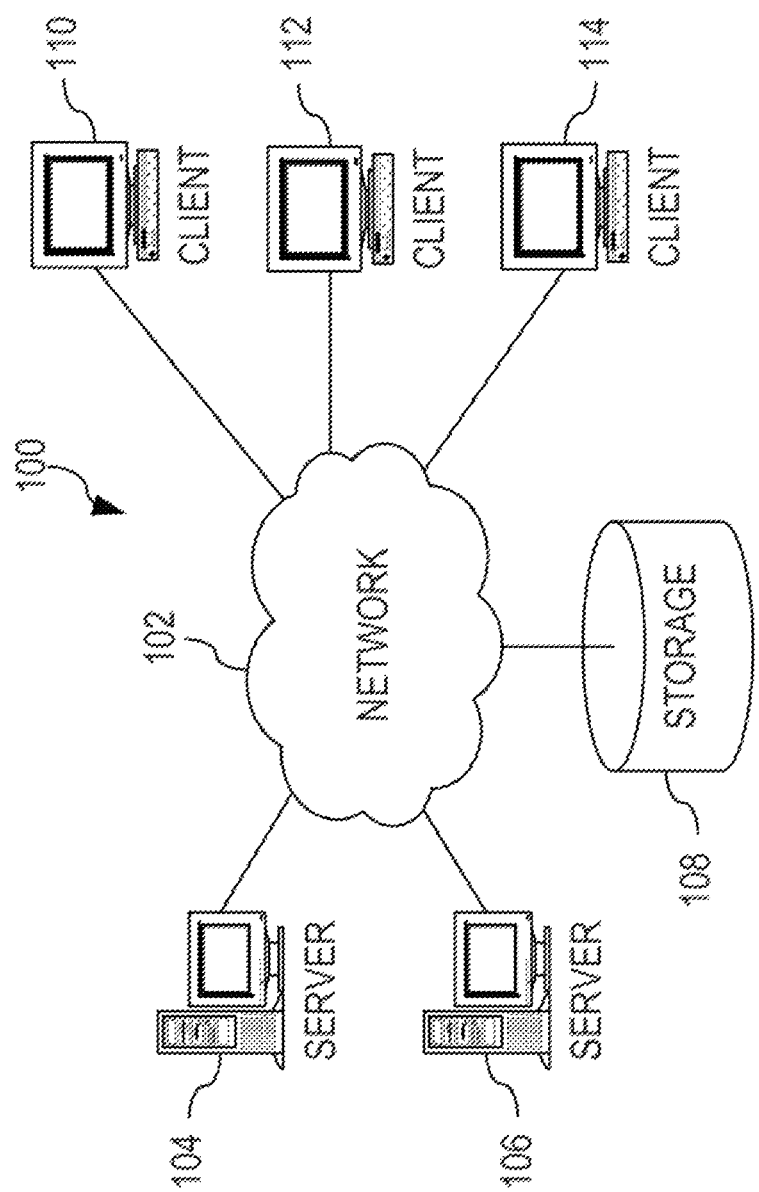
FIG. 1 depicts a pictorial representation of an example distributed system in which aspects of the illustrative embodiments may be implemented, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

It should be understood that the figures are merely schematic and are not drawn to scale. It should also be understood that the same reference numerals are used throughout the figures to indicate the same or similar parts.

In the context of the present disclosure, where embodiments of the present disclosure constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present disclosure. For instance, a system may be a personal computer (PC), a server, or a collection of PCs and/or servers connected via a network, such as a local area network or the Internet, to cooperatively execute at least some embodiments of the methods of the present disclosure.

Two types of traditional mutation testing are first order mutation testing and higher order mutation testing. First order mutation testing typically includes changing a single point within a program for each test (i.e., one mutation is formed). In contrast, higher order mutations include creating more than one change (i.e., a combination of mutations or first order mutants). First order mutation testing is comparatively inefficient, time-consuming, and expensive to run due to the large number of mutants required.

For example, combining first order mutants to create a second order mutant (i.e., a higher order mutant) reduces the number of mutants. Consequently, if the higher order mutant code is not killed, required computational time is saved, improving the feasibility of integrating mutation tests into continuous integration systems. However, the mutation coverage calculated using higher order mutation testing is not as precise as the coverage calculated using first order mutation testing due to the loss of information regarding the status of each underlying first-order mutant.

The efficiency of mutation testing can be increased by running the mutation tests on multiple computer processing units (CPU). This enables the mutants to be tested in parallel, reducing the required computational time. However, this still results in the same number of mutants being run throughout the test, as well as requiring more processing power and resources, increasing the cost of the process.

Embodiments of the present disclosure seek to provide a computer-implemented method for creating a higher order mutant for mutation testing software. Embodiments of the present disclosure further seek to provide a computer program product including computer program code for implementing a proposed method when executed by a processing unit. Embodiments of the present disclosure also seek to provide a processing system adapted to execute this computer program code. Embodiments of the present disclosure also seek to provide a system for creating a higher order mutant for mutation testing software.

Methods for creating a higher order mutant for mutation testing are disclosed herein. Such concepts may enable forming a higher order mutant by combining first order mutants that run along unique code paths to increase the efficiency of mutation testing. Accordingly, embodiments may facilitate the creation of higher order mutants by combining first order mutants whose associated code paths do not overlap.

Such methods may involve reducing the total number of mutants required to effectively and efficiently perform mutation testing against the code base of a given software project. The number of required mutants is reduced by intelligently combining first order mutants that run along unique code paths, or whose test code paths do not overlap, to create higher order mutants whose first order mutants will not interact with each other.

Embodiments of the present disclosure may be implemented in conjunction with mutation testing. The process may involve modifying a program in small ways to create mutants of the original code. Mutants are often based on well-defined mutation operators that either mimic typical programming errors (such as using the wrong operator or variable name) or force the creation of valuable tests (such as dividing each expression by zero). The mutation tests may detect and reject mutants by causing the behavior of the original version to differ from that of the mutant. This is referred to as "killing" the mutant code. A performance of a test suite (i.e., a set of individual tests) may be measured by the percentage of mutant code that they kill. The purpose of mutation testing is to help software engineers create effective tests and locate weaknesses in their tests.

Embodiments of the present disclosure may further be implemented in conjunction with running the mutation tests on multiple computer processing units (CPU), such that mutation testing for each of a set of higher order mutants may be performed in parallel.

Proposed embodiments of the present disclosure may employ a method of intentionally selecting first order mutant combinations which will not have an effect on each other's test outcomes. In this way, the testing of higher order mutants may have precision equal to the testing of first order mutants. The time taken to perform the mutation testing on a given code base is directly proportional to the number of mutants. Thus, by reducing the number of mutants, the time taken to perform mutation testing on the code base may be reduced. Embodiments of the present disclosure may therefore reduce a computation time to run all mutations, whilst retaining a coverage accuracy equal to that of first order mutants.

Accordingly, the provision of an associating unit is proposed. Such an associating unit may be configured to, for each first order mutant of a plurality of first order mutants, associate the first order mutant with the one or more identified code paths it interacts with. The first order mutants may then be combined into sets based on the one or more associated code paths, such that the first order mutants in each set may not interact with each other. A higher order mutant may be formed from each set of the first order mutants.

Embodiments of the present disclosure may thus facilitate identifying the code paths used for each software test in a test suite, for example, by way of a trace listener. Each code path may be assigned an identifier (i.e., a unique ID). The first order mutants that interact with each of the software test code paths are identified, and each of the first order mutants is assigned the identifier for each relevant code path that the first order mutant interacts with. In some embodiments, the first order mutants that share the same set of identifiers may be clustered together (i.e., combined). Higher order mutants may be created from the sets of first order mutants that have no overlapping unique identifiers (i.e., no overlapping code paths).

In at least one embodiment of the present disclosure, the one or more code paths associated with a primary first order mutant of the two or more first order mutants may not be associated with the other first order mutants of the two or more first order mutants. In this way, first order mutants may be intelligently combined to create higher order mutants whose first order mutants will not interact with each other. This may enable mutation testing of the higher order mutants to have equal precision to that of mutation testing of the first order mutants. Consequently, the total number of mutants required to effectively perform the mutation testing against the code base of a given software project may be reduced. This may enable the efficiency of the mutation testing to be improved without compromising the precision and the reliability of the testing.

In some embodiments of the present disclosure, identifying the respective code path for each of the set of software tests may comprise, for each of the software tests, obtaining the respective code path. Identifying the respective code path for each of the set of software tests may then comprise assigning a path identifier to each of the one or more obtained code paths. In this way, a unique identifier may be provided to each of the one or more obtained code paths. As such, the efficiency of managing and coordinating the code paths and the first order mutants during the process of combining the first order mutants to create the higher order mutant may be improved. As a result, the need to identify a code path more than once may be reduced, which may reduce the required computational time.

In at least one embodiment of the present disclosure, associating the first order mutant with the one or more identified code paths it interacts with may comprise generating a first order mutant, then identifying the one or more code paths the generated first order mutant interacts with. Associating the first order mutant with the one or more identified code paths it interacts with may then comprise, in response to identifying the one or more code paths, associating the first order mutant with the one or more identified code paths it interacts with. In this way, the first order mutant may be created manually (i.e., by a user) or automatically (e.g., by a machine-learning algorithm). This may enable the first order mutants to be tailored to a predetermined specification and may provide greater control and versatility in creating the higher order mutant.

In some embodiments of the present disclosure, associating the first order mutant with the one or more identified code paths it interacts with may comprise associating the first order mutant with the one or more identified code paths that comprise code affected by the first order mutant. In this way, the code paths that each of the first order mutants passes through may be detected. Consequently, this enables the first order mutants to be distinguished and combined based on whether their respective code paths overlap. As such, the higher order mutant may be created to improve the efficiency of the mutation testing.

In at least one embodiment of the present disclosure, creating the higher order mutant by combining the two or more first order mutants based on the one or more associated code paths may comprise organizing the two or more first order mutants based on the one more associated code paths. Creating the higher order mutant by combining the two or more first order mutants based on the one or more associated code paths may then comprise creating the higher order mutant by combining the two or more organized first order mutants. In this way, the higher order mutant may be created based on the one or more code paths associated with the corresponding first order mutants of the higher order mutant. As a result, the number of mutants required to effectively perform the mutation testing may be intelligently reduced. The time it takes to perform mutation testing on a given code base is directly proportional to the number of mutants. Thus, by reducing the number of mutants, the time taken to perform the mutation testing on the code base may be reduced.

In at least one embodiment of the present disclosure, there is provided a computer-implemented method for classifying a measure of performance for mutation testing software (i.e., a classifying method). The classifying method may comprise creating a higher order mutant for mutation testing software according to the method discussed above (i.e., a creating method). The method for classifying a measure of performance for mutation testing software may further comprise, for each of the set of software tests, executing the software test using the higher order mutant, then classifying a measure of performance of the software test based on the executed software test. In this way, the improved efficiency and reduced cost of higher order mutation testing may be merged with the improved precision and information retention of first order mutation testing. As a result, the higher order mutant may be created without having to run the first order mutants in the mutation testing, which may reduce the computational time required for the mutation testing.

In some embodiments, the method for classifying a measure of performance for mutation testing software may further comprise, in response to the software test detecting and rejecting the higher order mutant, disassembling the higher order mutant to obtain the two or more respective first order mutants. The classifying method may then comprise executing the software test using a primary first order mutant of the two or more obtained first order mutants. The classifying method may further comprise, in response to the software test detecting and rejecting the primary first order mutant, executing the software test using a secondary first order mutant from the two or more obtained first order mutants. In this way, an issue within a software test, along with its location within a code base, may be discovered accurately and efficiently.

According to an aspect of the present invention, there is provided a computer-implemented method. The method comprises, for each of a set of software tests, identifying a respective code path. The method then comprises, for each first order mutant of a plurality of first order mutants, associating the first order mutant with the one or more identified code paths it interacts with, then creating a higher order mutant by combining two or more first order mutants based on the one or more associated code paths.

According to yet another aspect of the invention, there is provided a system for creating a higher order mutant for mutation testing software. The system comprises an identifying unit configured to, for each of a set of software tests, identify a respective code path. The system further comprises an associating unit configured to, for each first order mutant of a plurality of first order mutants, associate the first order mutant with the one or more identified code paths it interacts with. The system further comprises a creating unit configured to create a higher order mutant by combining two or more first order mutants based on the one or more associated code paths.

According to another aspect of the invention, there is provided a computer program product for creating a higher order mutant for mutation testing software. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

FIG. 1 is a pictorial representation of an example distributed system 100 in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first server 104 and a second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet, and the network 102 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
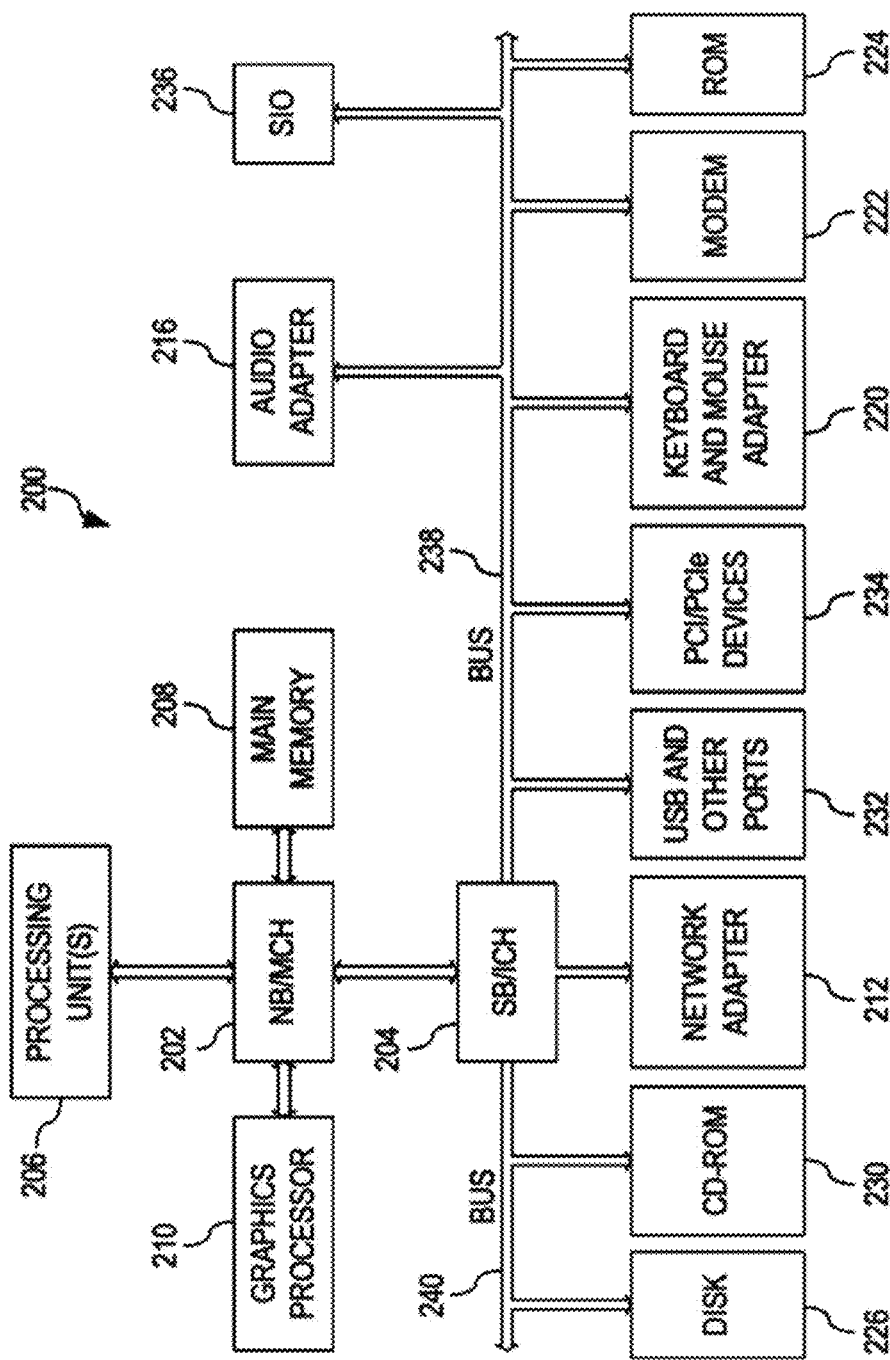
FIG. 2 is a block diagram of an example system in which aspects of the illustrative embodiments may be implemented, in accordance with embodiments of the present disclosure.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located. For instance, the system 200 may be configured to implement an identifying unit, an associating unit, and a creating unit according to some embodiments.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, universal serial bus (USB) ports and other communication ports 232, and PCI/PCIe devices 234 connect to the SB/ICH 204 through a first bus 238 and a second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to some embodiments may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
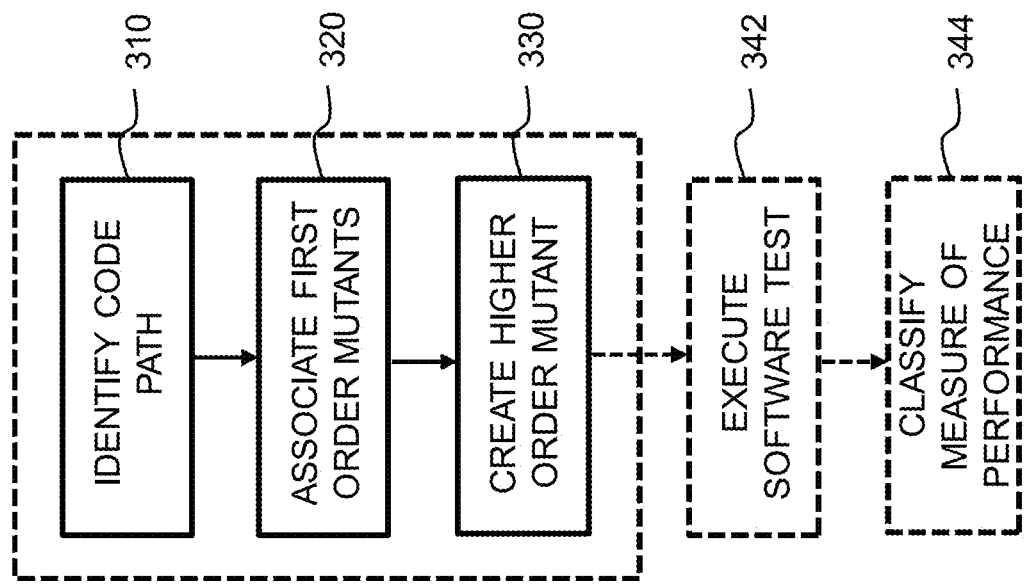
FIG. 3 is a flow diagram of a computer-implemented method for creating a higher order mutant for mutation testing software, in accordance with embodiments of the present disclosure.
Figure 4:
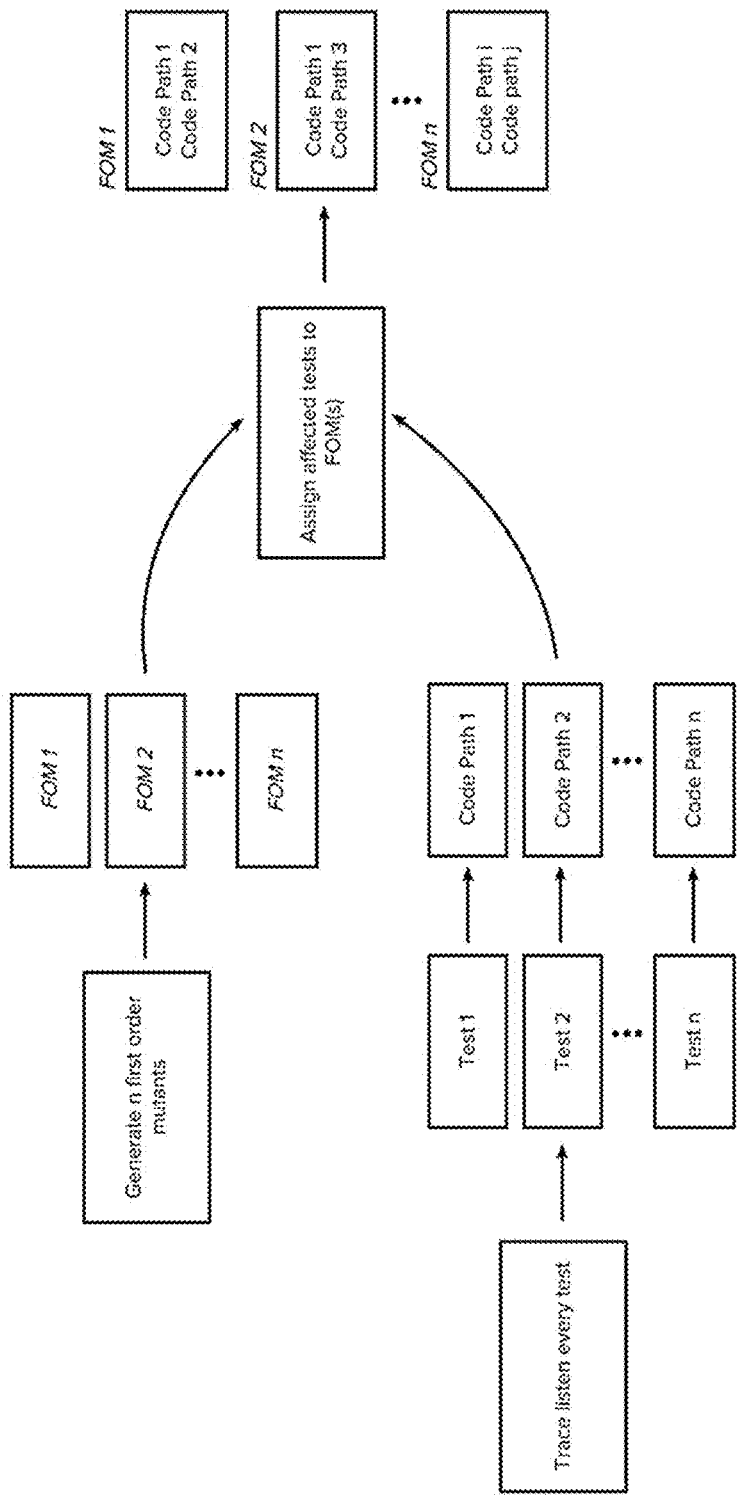
FIG. 4 illustrates a flow diagram of an example method for associating a first order mutant with one or more identified code paths it interacts with, in accordance with embodiments of the present disclosure.

Referring now to FIG. 3, there is depicted a flow diagram of an example computer-implemented method for creating a higher order mutant for mutation testing software, according to embodiments of the present disclosure. Operation 310 comprises, for each of a set of software tests, identifying a respective code path. For example, a test suite comprises individual tests (i.e., a set of software tests). Each of the individual software tests is analyzed (i.e., traced) to obtain a path through the corresponding source code. This example is depicted in FIG. 4, wherein a code path (Code Path 1, Code Path 2, more generally Code Path n) is identified for each of the set of software tests (Test 1, Test 2, more generally Test n). In the example, the analysis is completed by way of a trace tool (i.e., a trace listener). The trace tool requires a "first pass" execution of the tests in order to obtain the source code path related to each test. Once this first set of data has been found/determined, the obtained code paths are then cached (i.e., stored) to improve the efficiency of future tests (i.e., by increasing the speed of reads on future tests). The code paths are cached until the relevant test code or source code is modified to an extent that requires retracing to take place.

By way of example, identifying the respective code path for each of the set of software tests comprises two sub-steps. The first sub-step comprises, for each of the software tests, obtaining the respective code path. The second sub-step then comprises assigning a path identifier to each of the one or more obtained code paths. In the example discussed above, the individual code paths that are obtained are assigned an identifier (i.e., a unique ID). This identifier can then be used when mapping which code paths are affected by particular first order mutants.

Operation 320 comprises, for each first order mutant of a plurality of first order mutants, associating the first order mutant with the one or more identified code paths it interacts with. In some embodiments, associating the first order mutant with the one or more identified code paths it interacts with comprises three main sub-steps: (i) generating a first order mutant; (ii) identifying the one or more code paths the generated first order mutant interacts with; and (iii) in response to identifying the one or more code paths, associating the first order mutant with the one or more identified code paths it interacts with.

In some embodiments, associating the first order mutant with the one or more identified code paths it interacts with comprises associating the first order mutant with the one or more identified code paths that comprise code affected by the first order mutant. In the example depicted in FIG. 4, a set of first order mutants FOM 1, FOM 2, FOM n are generated by way of a mutation testing framework to apply against the source code before running the software tests. Each first order mutant affects a single point within the program (i.e., a line of code). In this way, the identified code paths that will pass through each of the set of first order mutants are detected. Based on the detected first order mutants FOM 1, FOM 2, FOM n, the identifier (i.e., unique ID) assigned to each of the obtained code paths (Code Path 1, Code Path 2, Code Path n) is further assigned to each related first order mutant. First order mutant FOM 1 affects Code Paths 1 and 2, therefore Code Paths 1 and 2 are assigned to first order mutant FOM 1. First order mutant FOM 2 affects Code Paths 1 and 3, therefore Code Paths 1 and 3 are assigned to first order mutant FOM 2. More generally, first order mutant FOM n affects Code Paths i and j, therefore Code Paths i and j are assigned to first order mutant FOM n. This provides a one-to-many mapping from each first order mutant to its affected software test(s).

Figure 5:
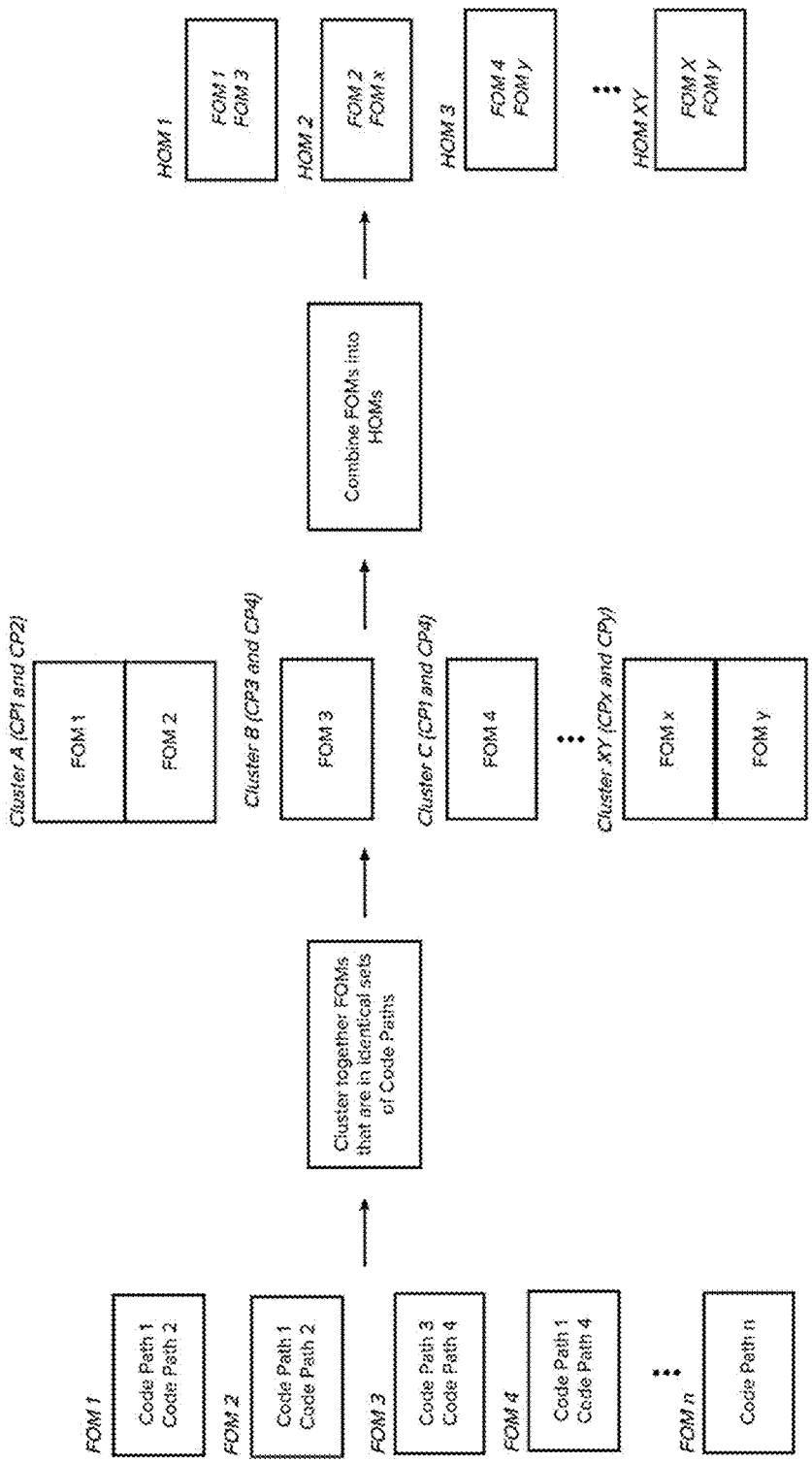
FIG. 5 is a flow diagram of an example method for creating a higher order mutant by combining two or more first order mutants containing unique code paths, in accordance with embodiments of the present disclosure.

Operation 330 comprises creating a higher order mutant by combining two or more first order mutants based on the one or more associated code paths. In some embodiments, creating the higher order mutant by combining the two or more first order mutants based on the one or more associated code paths comprises two steps: (a) organizing the two or more first order mutants based on the one more associated code paths; and (b) creating the higher order mutant by combining the two or more organized first order mutants. In the example, first order mutants that share code path identifiers must be run sequentially and are therefore clustered together for execution. In other words, the first order mutants that are in identical sets of code paths are clustered together (i.e., combined). This example is depicted in FIG. 5, wherein first order mutants are clustered together in identical set of code paths. First order mutants that contain Code Paths 1 and 2 include FOM 1 and FOM 2, therefore Cluster A (CP1 and CP2) contains FOM 1 and FOM 2. First order mutants that contain Code Paths 3 and 4 includes FOM 3, therefore Cluster B (CP3 and CP4) contains FOM 3. First order mutants that contain Code Paths 1 and 4 includes FOM 4, therefore Cluster C (CP1 and CP4) contains FOM 4. More generally, first order mutants that contain Code Paths x and y include FOM x and FOM y, therefore Cluster XY (CPx and CPy) contains FOM x and FOM y. First order mutants that contain one or more code paths, where the one or more code paths for each first order mutant is different from the other first order mutants, qualify to be combined into a higher order mutant. Higher order mutant HOM 1 is created by combining first order mutants FOM 1 and FOM 3. Higher order mutant HOM 2 is created by combining first order mutants FOM 2 and FOM x. Higher order mutant HOM 3 is created by combining first order mutant FOM 4 and FOM y. More generally, higher order mutant HOM XY is created by combining first order mutants FOM x and FOM y. Determining which code paths are different from each other is completed by way of the identifiers associated with the code paths.

In some embodiments, the one or more code paths associated with a primary first order mutant of the two or more first order mutants are not associated with the other first order mutants of the two or more first order mutants.

In some embodiments, there is provided a computer-implemented method for classifying a measure of performance for mutation testing software. The method comprises creating a higher order mutant for mutation testing software according to operations 310, 320, and 330. The method further comprises operations 342 and 344. Operation 342 comprises, for each of the set of software tests, executing the software test using the higher order mutant. Operation 344 comprises classifying a measure of performance of the software test based on the executed software test.

In some embodiments, the method for classifying a measure of performance for mutation testing software further comprises, in response to the software test, detecting and rejecting the higher order mutant. This comprises disassembling the higher order mutant to obtain the two or more respective first order mutants. The software test is then executed using a primary first order mutant of the two or more obtained first order mutants. Then, in response to the software test detecting and rejecting the primary first order mutant, the software test is executed using a secondary first order mutant from the two or more obtained first order mutants.

Figure 6:
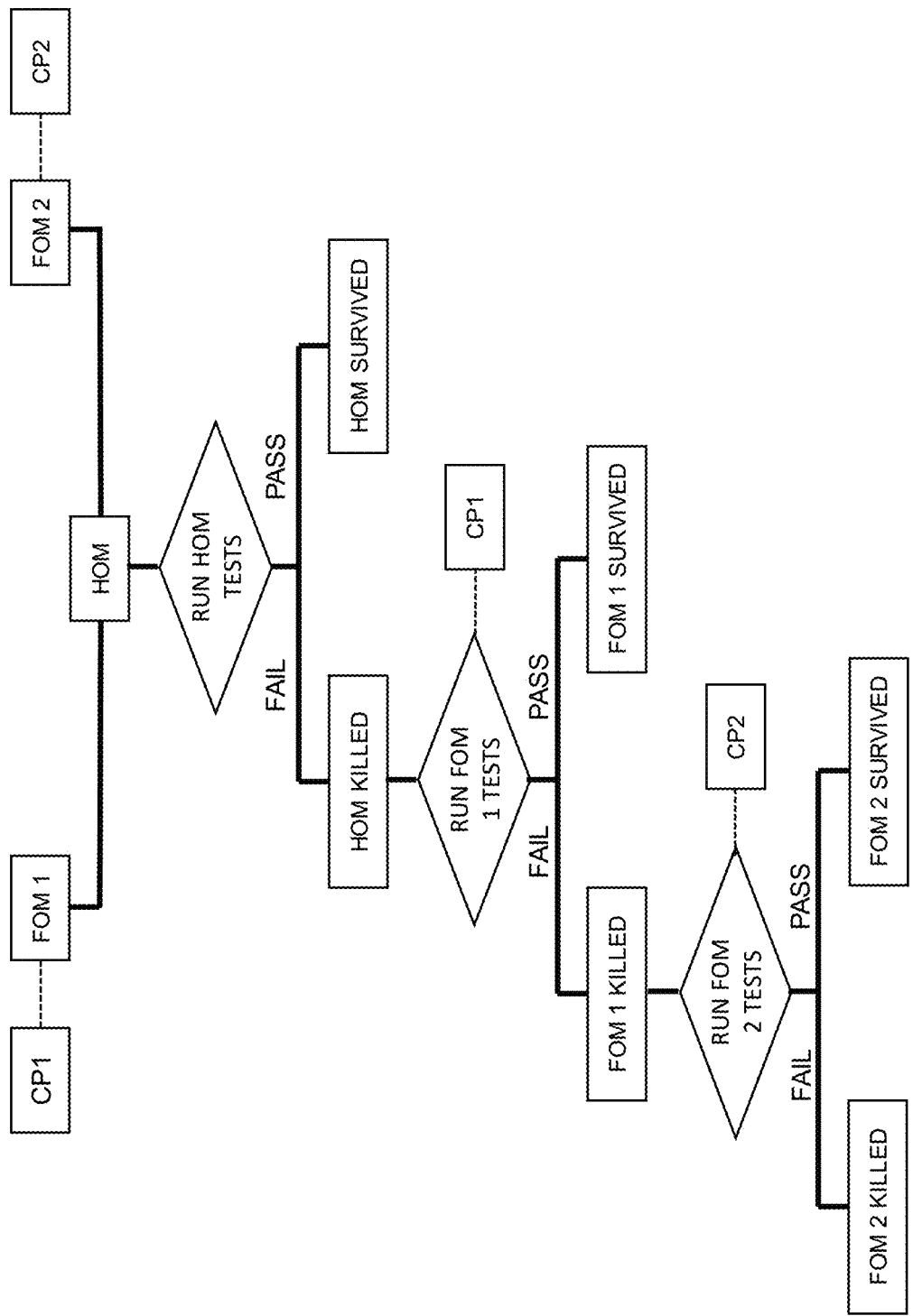
FIG. 6 is a flow diagram of an example method for classifying a measure of performance for mutation testing software, in accordance with embodiments of the present disclosure.

In the example, a higher order mutant code may be killed during the mutation testing. In cases where a higher order mutant code is killed but has run multiple first order mutants within it, the higher order mutant is to be broken down and separated into its individual first order mutants. Each of the first order mutants is then required to be run separately to determine which first order mutant code was successfully killed. This example is depicted in FIG. 6, wherein a higher order mutant HOM is created by combining two first order mutants FOM 1 and FOM 2. Each of the first order mutants FOM 1 and FOM 2 has an associated code path CP1 and CP2. A software test is run on each code path CP1 and CP2 corresponding to the higher order mutant HOM. Put another way, a higher order mutant HOM is created which contains both FOM 1 and FOM2, and then all of the software tests are run for the higher order mutant HOM. Here, the software tests are the tests which the developers use to determine whether code performs as expected e.g., unit tests. The higher order mutant HOM is deemed to have survived if all of the software tests are passed. Conversely, the higher order mutant HOM code is killed if one or more of the software tests are failed.

In response to the higher order mutant HOM code being killed, the higher order mutant HOM is deconstructed back to its corresponding first order mutants FOM 1 and FOM 2 and the tests are run for the first order mutant FOM 1. The first order mutant FOM1 is deemed to have survived if all of the software tests are passed. In response to the first order mutant FOM 1 surviving, it is assigned a classification that indicates mutant survival. No test of first order mutant FOM 2 is then required, because what caused the higher order mutant HOM code to be killed must have been the first order mutant FOM 2. Put another way, if the first order mutant FOM 1 when run on its own does not cause test failure, it is implicit that the first order mutant FOM 2 must have been the cause for the higher order mutant HOM code being killed. Conversely, if the first order mutant FOM 1 code is killed, nothing has been learned for the first order mutant FOM 2, and so the tests are run for the first order mutant FOM 2. The first order mutant FOM 2 is deemed to have survived if all of the software tests are passed. Conversely, the first order mutant FOM 2 code is killed if one or more of the software tests are failed. It will be appreciated that this approach may dramatically decrease the number of first order mutant FOM tests which have to be run. Further, this principle can be applied to the final first order mutant FOM of a higher order mutant HOM being tested (regardless of how many there are).

Figure 7:
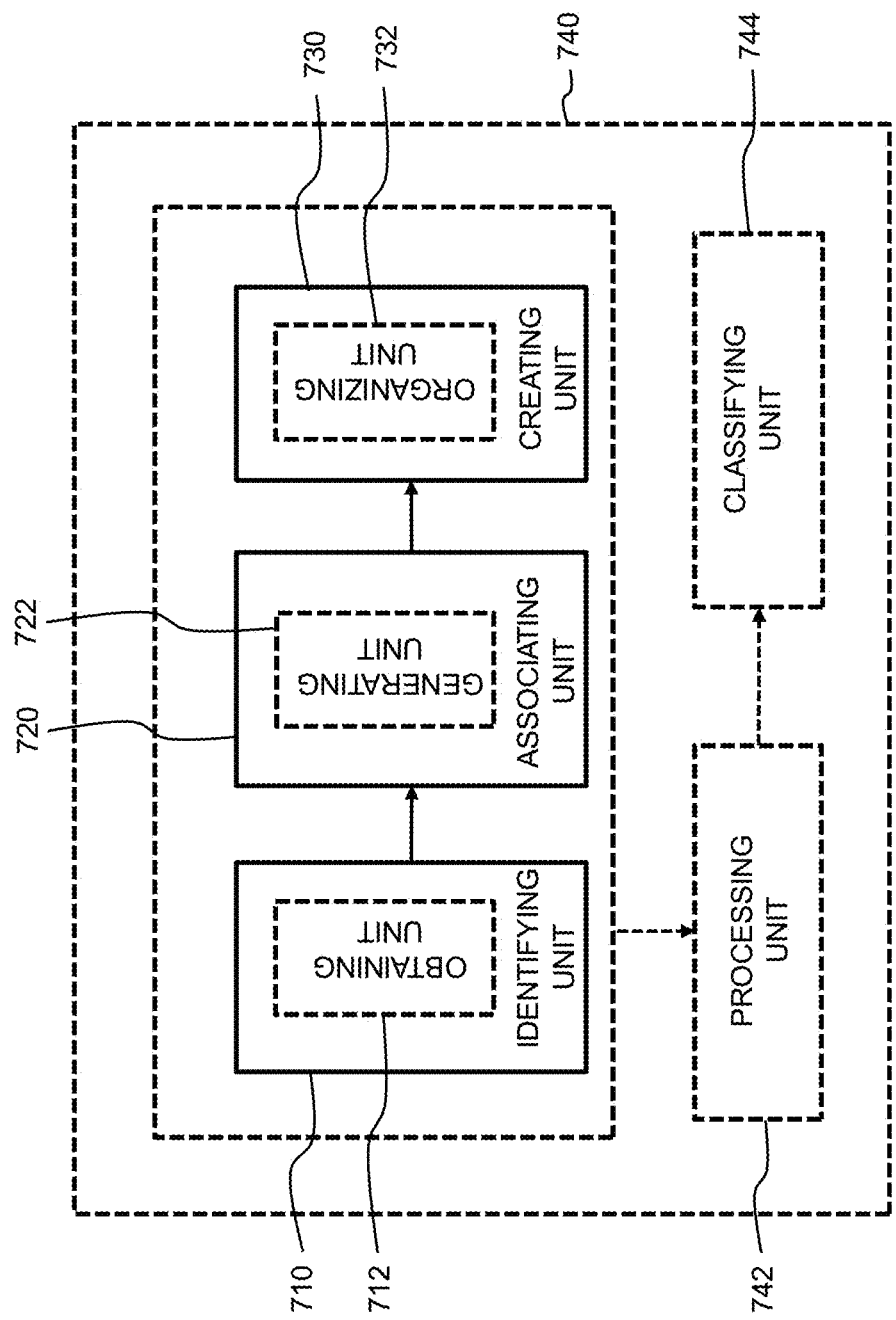
FIG. 7 is a simplified block diagram of an example system for creating a higher order mutant for mutation testing software, in accordance with embodiments of the present disclosure.

Referring now to FIG. 7, there is depicted a simplified block diagram of an example system for creating a higher order mutant for mutation testing software. The system comprises an identifying unit 710 configured to, for each of a set of software tests, identify a respective code path. The system further comprises an associating unit 720 configured to, for each first order mutant of a plurality of first order mutants, associate the first order mutant with the one or more identified code paths it interacts with. The system further comprises a creating unit 730 configured to create a higher order mutant by combining two or more first order mutants based on the one or more associated code paths.

In some embodiments, the one or more code paths associated with a primary first order mutant of the two or more first order mutants are not associated with the other first order mutants of the two or more first order mutants.

In some embodiments, the identifying unit 710 comprises an obtaining unit 712 configured to, for each of the set of software tests, obtain the respective code path. In such embodiments, the identifying unit 710 further comprises an assigning unit (not shown) configured to assign a path identifier to each of the one or more obtained code paths.

In some embodiments, the associating unit 720 comprises a generating unit 722 configured to generate the first order mutant, wherein the identifying unit 710 is further configured to identify the one or more code paths the first order mutant interacts with. The associating unit 720 is further configured to, in response to the identification of the one or more code paths, associate the first order mutant with the one or more identified code paths it interacts with. In some embodiments, the associating unit 720 is further configured to associate the first order mutant with the one or more identified code paths that comprises code affected by the first order mutant.

In some embodiments, the creating unit 730 comprises an organizing unit 732 configured to organize the two or more first order mutants based on the one or more associated code paths. The creating unit 730 is further configured to create the higher order mutant by combining the two or more organized first order mutants.

In some embodiments, there is provided a system 740 for classifying a measure of performance for mutation testing software. The system 740 comprises the system for creating a higher order mutant for mutation testing software. The system 740 further comprises a processing unit 742 configured to, for each of the set of software tests, execute the software test using the higher order mutant. The system 740 further comprises a classifying unit 744 configured to classify a measure of performance of the software test based on the executed software test.

In some embodiments, the processing unit 742 is further configured to, in response to the software test detecting and rejecting the higher order mutant, disassemble the higher order mutant to obtain the two or more respective first order mutants. The processing unit 742 is further configured to execute the software test using a primary first order mutant of the two or more obtained first order mutants. In response to the software test detecting and rejecting the primary first order mutant, the processing unit 742 is further configured to execute the software test using a secondary first order mutant from the two or more obtained first order mutants.

Figure 8:
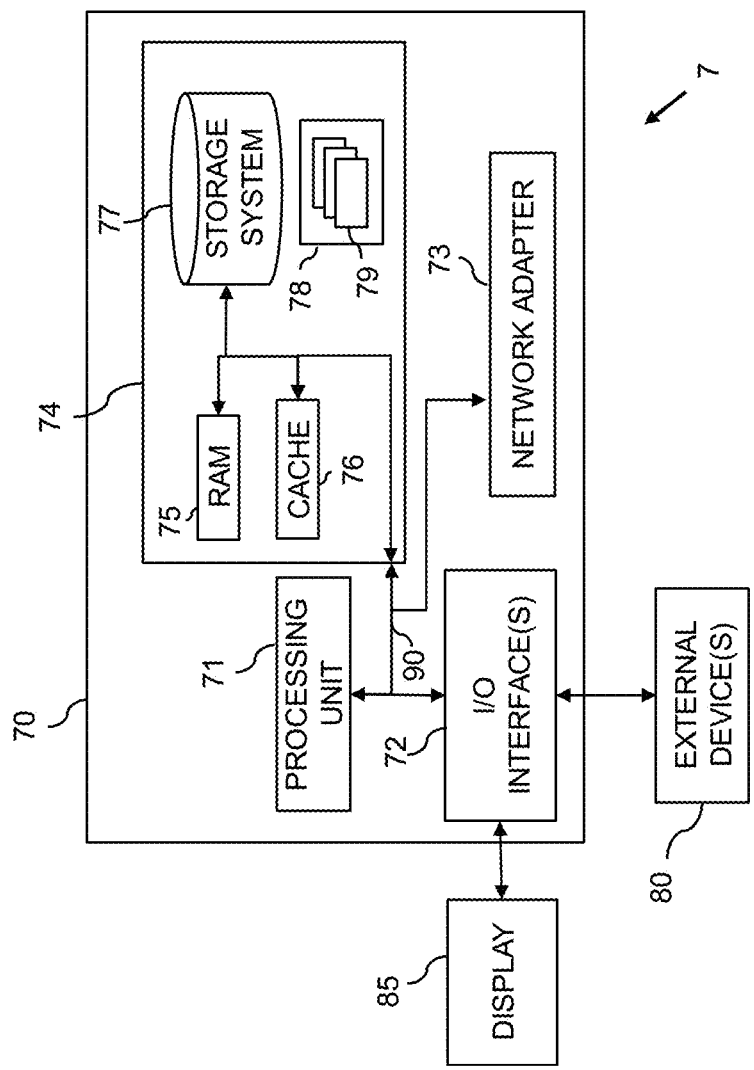
FIG. 8 is a simplified block diagram of an example system for creating a higher order mutant for mutation testing software, in accordance with embodiments of the present disclosure.

By way of further example, as illustrated in FIG. 8, embodiments of the present disclosure may comprise a computer system 70, which may form part of a networked system 7. For instance, an identifying unit, such as 710 in FIG. 7, may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform a method for creating a higher order mutant for mutation testing software according to a proposed embodiment.

Program/utility 78, having a set (at least one) of program modules 79, may be stored in memory 74. Program modules 79 generally carry out the functions and/or methodologies of proposed embodiments for creating a higher order mutant for mutation testing software.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a higher order mutant for mutation testing software, the method comprising:

for each software test of a set of software tests, identifying a respective code path;

for each first order mutant of a plurality of first order mutants, associating the first order mutant with the one or more identified code paths it interacts with; and creating a higher order mutant by combining two or more first order mutants of the plurality of first order mutants based on the one or more associated code paths, wherein:

the one or more code paths associated with a particular first order mutant of the two or more first order mutants do not overlap with the one or more code paths associated with the other first order mutants of the two or more first order mutants.

2. The method of claim 1, wherein, for each software test of the set of software tests, identifying the respective code path comprises:

obtaining the respective code path; and assigning a path identifier to each of the one or more obtained code paths.

3. The method of claim 1, wherein associating the first order mutant with the one or more identified code paths it interacts with comprises:

generating a first order mutant;

identifying the one or more code paths the generated first order mutant interacts with; and in response to identifying the one or more code paths, associating the first order mutant with the one or more identified code paths it interacts with.

4. The method of claim 1, wherein associating the first order mutant with the one or more identified code paths it interacts with comprises:

associating the first order mutant with the one or more identified code paths that comprise code affected by the first order mutant.

5. The method of claim 1, wherein creating the higher order mutant by combining the two or more first order mutants based on the one or more associated code paths comprises:

organizing the two or more first order mutants based on the one or more associated code paths; and creating the higher order mutant by combining the two or more organized first order mutants.

6. The method of claim 1, further comprising:

classifying a measure of performance for mutation testing software, including:

for each of the set of software tests, executing the software test using the higher order mutant; and classifying a measure of performance of the software test based on the executed software test.

7. The method of claim 6, further comprising, in response to a software test detecting and rejecting the higher order mutant:

disassembling the higher order mutant to obtain the two or more respective first order mutants;

executing software test using a first particular first order mutant of the two or more Obtained first order mutants; and in response to the software test detecting and rejecting the first particular first order mutant, executing the software test using a second particular first order mutant from the two or more obtained first order mutants.

8. The method of claim 1, wherein:

the particular first order mutant is associated with a first code path;

a further particular first order mutant of the two or more first order mutants is associated with a second code path that is different than the first code path;

the particular first order mutant is not associated with the second code path; and the further particular first order mutant is not associated with the first code path.

9. The method of claim 1, wherein creating a higher order mutant includes:

generating a first cluster of first order mutants, wherein all of the first order mutants in the first cluster are associated with a first identical set of code paths;

generating a second cluster of first order mutants, wherein all of the first order mutants in the second cluster are associated with a second identical set of code paths, wherein the first identical set of code paths does not have any code paths in common with the second identical set of code paths; and combining one first order mutant from the first cluster and one first order mutant from the second cluster.

10. A computer program product for creating a higher order mutant for mutation testing software, the computer program product comprising a computer readable storage medium having program instructions embodied therewith, the program instructions executable by a processing unit to cause the processing unit to perform a method comprising:

for each software test of a set of software tests, identifying a respective code path;

for each first order mutant of a plurality of first order mutants, associating the first order mutant with the one or more identified code paths it interacts with; and creating a higher order mutant by combining two or more first order mutants of the plurality of first order mutants based on the one or more associated code paths, wherein:

the one or more code paths associated with a particular first order mutant of the two or more first order mutants do not overlap with the one or more code paths associated with the other first order mutants of the two or more first order mutants.

11. The computer program product of claim 10, wherein associating the first order mutant with the one or more identified code paths it interacts with comprises:

associating the first order mutant with the one or more identified code paths that comprise code affected by the first order mutant.

12. The computer program product of claim 10, wherein creating the higher order mutant by combining the two or more first order mutants based on the one or more associated code paths comprises:

organizing the two or more first order mutants based on the one or more associated code paths; and creating the higher order mutant by combining the two or more organized first order mutants.

13. The computer program product of claim 10, further comprising:

classifying a measure of performance for mutation testing software, including:

for each of the set of software tests, executing the software test using the higher order mutant; and classifying a measure of performance of the software test based on the executed software test.

14. The computer program product of claim 13, further comprising, in response to a software test detecting and rejecting the higher order mutant:

disassembling the higher order mutant to obtain the two or more respective first order mutants;

executing the software test using a first particular first order mutant of the two or more obtained first order mutants; and in response to the software test detecting and rejecting the first particular first order mutant, executing the software test using a second particular first order mutant from the two or more obtained first order mutants.

15. A system for creating a higher order mutant for mutation testing software, the system comprising a processor configured to:

for each software test of a set of software tests, identify a respective code path;

for each first order mutant of a plurality of first order mutants, associate the first order mutant with the one or more identified code paths it interacts with; and create a higher order mutant by combining two or more first order mutants of the plurality of first order mutants based on the one or more associated code paths, wherein:

the one or more code paths associated with a particular first order mutant of the two or more first order mutants do not overlap with the one or more code paths associated with the other first order mutants of the two or more first order mutants.

16. The system of claim 15, wherein, for each of the software tests of the set of software tests, identifying a respective code path comprises:

obtaining the respective code path; and assigning a path identifier to each of the one or more obtained code paths.

17. The system of claim 15, wherein associating the first order mutant with the one or more identified code paths it interacts with comprises:

generating the first order mutant;

identifying the one or more code paths the generated first order mutant interacts with; and in response to identifying the one or more code paths, associate the first order mutant with the one or more identified code paths it interacts with.

18. The system of claim 15, wherein associating the first order mutant with the one or more identified code paths it interacts with comprises:

associating the first order mutant with the one or more identified code paths that comprise code affected by the first order mutant.

19. The system of claim 15, wherein creating the higher order mutant by combining the two or more first order mutants based on the one or more associated code paths comprises:

organizing the two or more first order mutants based on the one or more associated code paths; and creating the higher order mutant by combining the two or more organized first order mutants.

20. The system of claim 15, wherein the processor is further configured to:

classify a measure of performance for mutation testing software, including:

for each of the set of software tests, executing the software test using the higher order mutant; and classifying a measure of performance of the software test based on the executed software test.

* * * * *